United States Patent [19]

Brussen

[11] 4,255,321
[45] * Mar. 10, 1981

[54] STABILIZED POLYPHENYLENE ETHER

[75] Inventor: Reinier W. Brussen, Arnhem, Netherlands

[73] Assignee: General Electric Company, Pittsfield, Mass.

[ * ] Notice: The portion of the term of this patent subsequent to Mar. 10, 1996, has been disclaimed.

[21] Appl. No.: 385

[22] Filed: Jan. 2, 1970

[51] Int. Cl.$^3$ ......................... C08K 3/30; C08L 25/06; C08L 71/04
[52] U.S. Cl. ..................... 260/45.75 W; 260/45.7 ST; 260/45.7 PH; 525/132
[58] Field of Search ................ 260/874, 45.75, 45.7 S, 260/45.7 ST, 45.75 W, 45.7 PH; 525/132

[56] References Cited

U.S. PATENT DOCUMENTS

| | | | |
|---|---|---|---|
| 3,352,820 | 11/1967 | Bawn | 260/45.75 |
| 3,383,435 | 5/1968 | Cizek | 260/874 |
| 3,453,231 | 7/1969 | Bussink et al. | 260/45.9 |
| 3,468,844 | 9/1969 | Merriam et al. | 260/45.75 |

*Primary Examiner*—Wilbert J. Briggs, Sr.
*Attorney, Agent, or Firm*—Morgan, Finnegan, Pine, Foley & Lee

[57] ABSTRACT

A stabilized polymer composition comprising a blend of a poly-(2,6-dialkyl-1,4-phenylene) ether and a polystyrene stabilized with an inorganic sulfide alone or in combination with an organic phosphite. The combination of the sulfide and the phosphite appears to provide a synergism resulting in substantially increased resistance to oxygen containing atmospheres.

3 Claims, No Drawings

STABILIZED POLYPHENYLENE ETHER

BACKGROUND OF THE INVENTION

1. Introduction

This invention relates to polymer blends and more particularly, to blends of a polyphenylene ether and a polystyrene stabilized with a stabilizer combination comprising an inorganic sulfide alone or in combination with an organic phosphite.

2. Description of the Prior Art

The polyphenylene ethers are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff, all incorporated herein by reference. The high molecular weight polyphenylene ethers are high performance engineering thermoplastics possessing relatively high melt viscosities and softening points; i.e., in excess of 250° C., and are useful for many commercial applications requiring high temperature resistance including formation of film, fiber and molded articles.

In U.S. Pat. No. 3,383,435, a polymer blend is disclosed comprising a polyphenylene ether and a polystyrene. The polystyrene improves the melt processability of the polyphenylene ether while the polyphenylene ether simultaneously upgrades many of the properties of the polystyrene. The invention of this patent is based upon the discovery that the polyphenylene ethers and the polystyrenes, including the modified polystyrenes, are combinable in all proportions resulting in blends having many properties improved over those of either of the components. As disclosed in said patent, the polystyrenes combinable with the polyphenylene ether are those having at least 25% by weight polymer units derived from a monomer having the formula:

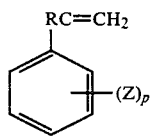

where R is a hydrogen, lower alkyl or halogen; Z is a member selected from the class consisting of vinyl, hydrogen, halogen and lower alkyl; and p is 0 or whole number equal to from 1 to 5. The preferred composition of this patent is a poly-(2,6-dialkyl-1,4-phenylene)ether combined with polystyrene or rubber-modified polystyrene.

It is known in the art that both the polyphenylene ethers and the polystyrenes are somewhat unstable under the influence of heat and light in oxygen containing atmospheres causing the polymers to become dark colored, brittle and undesirable for many uses. As a result, many effective stabilizing systems have been found for each of the polymers alone. However, it has also been found that using combinations of known stabilizers for the polyphenylene ethers and the polystyrenes does not provide optimum stabilization of blends of these polymers.

STATEMENT OF THE INVENTION

The present invention provides new stabilizers for blends of the polyphenylene ethers with polystyrenes. A composition prepared in accordance with the invention comprises a major portion of a polyphenylene ether-polystyrene blend and a minor portion of an inorganic sulfide alone or in combination with an organic phosphite. A preferred composition comprises a poly-(2,6-dialkyl-1,4-phenylene)ether, a high impact polystyrene, and a stabilizing combination comprising the inorganic sulfide and an organic phosphite. It has been found that the combination of the sulfide with the phosphite provides a synergism resulting in a substantial increase in the resistance of the polymer to the degradative effects of oxygen containing atmospheres at elevated temperatures.

DESCRIPTION OF THE PREFERRED EMBODIMENTS

The polyphenylene ethers contemplated by the subject invention have repeating structural units of the formula

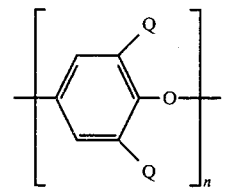

where the oxygen ether atom of one unit is connected to the benzene nucleus of the next adjoining unit, n is a positive integer and is at least 100, and each Q is alkyl, preferably having from 1 to 4 carbon atoms. Examples of polyphenylene ethers corresponding to the formula include poly-(2,6-dimethyl-1,4-phenylene)ether, poly-(2,6-diethyl-1,4-phenylene)ether, poly-(2-methyl-6-ethyl-1,4-phenylene)ether and the like.

The polystyrene portion of the polymer blend contemplated by the subject invention corresponds to formula I above and is as described in U.S. Pat. No. 3,383,435 referenced above. Suitable examples of such polystyrene resins can be found in said patent. The preferred polystyrene, for purposes of this invention, are those known in the art as the high-impact or rubber modified polystyrenes.

The ratio of polystyrene to polyphenylene ether in the polymer blend is not critical and is as described in U.S. Pat. No. 3,383,435. Preferably, the polyphenylene ether comprises from 20 to 80 weight percent of the blend and the polystyrene comprises from 80 to 20 weight percent. A most preferred ratio is from 40 to 60 percent polyphenylene ether and from 60 to 40 percent polystyrene.

It should be understood that other materials may be added to the blend of the polyphenylene ether and polystyrene such as pigments, plasticizers and other resins. For example, in U.S. Pat. No. 3,361,851, there is the disclosure of adding a polyolefin to improve various properties of the polyphenylene ethers.

The stabilizer in accordance with this invention is an inorganic sulfide alone or in combination with an organic phosphite. The particular inorganic sulfide used is not critical, representative examples of suitable sulfides including sodium sulfide, potassium sulfide, calcium sulfide, barium sulfide, zirconium sulfide, titanium sulfide, chromium sulfide, manganese sulfide, iron sulfide, cobalt sulfide, nickel sulfide, copper sulfide, zinc sulfide, cadmium sulfide, mercurous and mercuric sulfides, tin sulfide, lead sulfide, and the like. Most preferred sulfides are those of zinc and cadmium. The amount of sulfide added to the polymer formulation is not critical, small amounts providing some improvement and larger amounts providing greater improvement. Preferably, the sulfide in the formulation comprises at least 0.1% by weight and most preferably, from 0.2 to 5% by weight of the total formulation.

As noted above, the sulfide may be used alone as a stabilizer for the polymer blend or in combination with an organic phosphite. Where used with the organic phosphite, the phosphite is preferably present in an amount of from about 0.1 to 5% by weight. Representative examples of suitable organic phosphites include, by way of example, phenyldodecyl phosphite, phenylneopentyl phosphite, phenylethylene hydrogen phosphite, triethylene phosphite, dichloroethyl phosphite, tributyl phosphite, trilauryl phosphite, bis(2-ethylhexyl)hydrogen phosphite, phenylbis(3,5,5'-trimethylhexyl)phosphite, mixed 2-ethylhexyloctylphenyl phosphite, cis-9-octadecenyl diphenyl phosphite, 2-ethyl-hexyl di(p-tolyl)phosphite, allyl phenyl hydrogen phosphite, bis(2-ethylhexyl)p-tolyl phosphite, tridecyl phosphite, bis(2-ethylhexyl)phenyl phosphite, triallyl phosphite, triisooctyl phosphorotrithioite, tributyl phosphorotrithioite, trimethallyl phosphite, tri(nonylphenyl)phosphite, phenyl methyl hydrogen phosphite, bis(p-tert-butyl phenyl)octadecyl phosphite, triamyl, phosphite, (p-tert-butylphenyl)di (octadecyl) phosphite, diisopropyl hydrogen phosphite, p-cymyl dioctyl phosphite, dipropyl hydrogen phosphite, di(dodecyl)p-tolyl phosphite, triisooctyl phosphite, decyl bis(p-1,1,3,3-tetramethylbutyl-phenyl)phosphite, trimethyl phosphite, nonyl bis(p-1,1,3,3-tetramethylbutylphenyl)phosphite, diallyl hydrogen phosphite, diisodecyl p-tolyl phosphite, tricresyl phosphite, diisodecyl phenyl phosphite, triphenyl phosphite, octyl bis(3,5,5-trimethylhexyl)phosphite, dibutyl phenyl phosphite, di-p-tolyl 3,5,5-trimethylhexyl phosphite, 2-chloroethyl diphenyl phosphite, p-tolyl bis(2,5,5-trimethylhexyl)phosphite, diphenyl decyl phosphite, 2-ethylhexyl diphenyl phosphite, tris(2-ethyl-hexyl)phosphite, tri(octadecyl)phosphite, trioctyl phosphite, tris(2-chloroisopropyl)phosphite, dibutyl hydrogen phosphite, di(dodecyl)hydrogen phosphite, phenyl dodecyl phosphite, di(tridecyl)hydrogen phosphite, and diphenyl hydrogen phosphite.

In addition to combination of the inorganic sulfide stabilizer with the organic phosphite stabilizer, the combination may be further combined with other prior art stabilizers such as the ketenes, the mercaptobenziomidazoles, boron compounds and the like. When an additional stabilizer is used, the concentration of the sulfide and phosphite may be reduced somewhat though this is not necessary, and the additional stabilizer may be used in an amount about equivalent to that used in the absence of other stabilizers.

The manner of adding the stabilizer to the polyphenylene ether is not critical to the invention. Hence, any method can be employed. For example, the stabilizer can be blended with a resin power in a blender such as a Waring blender. Alternatively, the resin can be dissolved in suitable solvent and the stabilizer added to the solution. The stabilized polymer may then be recovered from solution. An additional method comprises preparing a premix of the components of the resinous composition, extruding the premix and chopping the extruded strands into pellets.

The stabilized compositions of this invention are useful for all purposes for which the polyphenylene ether-polystyrene blends have hitherto been used, for example, for conversion to films, fibers, molded articles and the like, by conventional methods.

The following examples serve to illustrate the invention further.

EXAMPLE 1

A blend was prepared comprising a standard formulation of 45 parts of a poly(2,6dimethyl-1,4-phenylene)ether identified as PPO polyphenylene ether and available from the General Electric Company, 55 parts of a high impact polystyrene (identified as Lustrex HT 91-1 available from Monsanto Chemical Company and believed to contain 6-10% butadiene) and 1.5 parts polyethylene. To this standard formulation were added 0.25 parts Acrawax C, 1 part tridecylphosphite, titanium dioxide and cadmium sulfide to show the improvement against oxidative attack by incorporation of the sulfide in the formulation. Test specimens were prepared by passing approximately 10 kilograms of the blend through a Reinfenhauser S 60 vented extruder to form an extruded strand which was chopped into pellets.

One gram samples of pressed film obtained from these pellets were heated in an oxygen atmosphere maintained at 125° C. and the time necessary for uptake of 5 to 10 cubic centimeters of oxygen per gram polymer blend determined.

Samples prepared from the formulations of this example were also used to measure time to embrittlement. This is determined by extruding pellets, and molding these into a thin tensile bar followed by heat aging the so formed tensile bar at 125° C. in air. Time to embrittlement is determined by measuring the tensile elongation of the bar at various times during the heat-aging process until it embrittles. This is the point where the sample no longer yields and snaps when partially folded.

The amount of cadmium sulfide used and the results obtained are set forth in the following table:

|  | Time (hrs.) until | |  |
| --- | --- | --- | --- |
| Additive (pbw) | 5 ccm Oxygen per gram | 10 ccm Oxygen per gram | Time to embrittlement (days) |
| Control | 4 | 19 | 1 |
| 1 TDP[1] | 5 | 24 | 1-2 |
| 0.2 CdS | 45 | 93 | 4-7 |
| 1 TDP + 0.2 CdS | 63 | 118 | 14 |
| 1 TDP + 0.05 CdS + 0.4 TiO$_2$ | 29 | 61 | 4-7 |
| 1 TDP + 0.2 CdS + 0.4 TiO$_2$ | 45 | 95 | 14 |

[1]Tridecylphosphite

EXAMPLE 2

The standard formulation of example 1 was repeated adding 0.25 parts Acrawax C (N,N' distearoylethylene diamine), 1 part of tridecylphosphite and various quantities of cadmium sulfide, and some pigments as titanium dioxide and others.

The amount of cadmium sulfide used and the results obtained are set forth in the following table:

| Sample Identification | Cadmium Sulfide[1] content (pbw) | Oxygen uptake[2] time (hrs at 125° C.) |
| --- | --- | --- |
| A | 0.02 | 75 |
| B | 0.03 | 95 |
| C | 0.10 | 95 |

-continued

| Sample Identification | Cadmium Sulfide[1] content (pbw) | Oxygen uptake[2] time (hrs at 125° C.) |
|---|---|---|
| D | 0.15 | 105 |
| E | 0.30 | 120 |
| F | 3.50 | 120 |
| Control | 0 | 12–15 |

[1] pbw-parts per 100 parts of resin
[2] time for 5 cubic centimeters of oxygen per gram polymer blend.

From the above table, it can be seen that significant improvement in resistance to oxygen uptake is realized by even small additions of cadmium sulfide, but increasing amounts beyond about 0.30 pbw provide little or no further improvement.

EXAMPLE 3

The standard formulation of example 1 was repeated adding 1 part tridecylphosphite, various amounts of Cadmiumsulfide, 0.25 parts Acrawax C and carbon black to provide a black sample.

Time was recorded when the samples had oxygen uptake of 5 ccm/gm and again at 10 ccm/gm.

The amount of cadmium sulfide added and the results obtained are set forth in the following table:

| Sample Identification | Cadmium Sulfide (pbw) Content | Oxygen uptake time (hours) (5 ccm/gm) | (10 ccm/gm) |
|---|---|---|---|
| A | 0.05 | 41 | 108 |
| B | 0.1 | 62 | 108 |
| C | 0.25 | 78 | 125 |
| D | 0.5 | 66 | 117 |
| Control | 0 | 8 | 22 |

EXAMPLE 4

The standard formulation of example 1 is repeated adding 0.25 parts Carbon Black, 1 part tridecylphosphite and 0.14 parts zinc sulfide in place of the cadmium sulfide. The time for oxygen uptake of 5 ccm/gm was found to be 105 hours and for 10 ccm/gm 146 hours.

The time for embrittlement was determined according to the procedure mentioned under example 1 and found to be 14 days compared to approximately one day for a sample free of the sulfide stabilizer.

EXAMPLE 5

The procedure of example 4 can be repeated substituting any of the following phosphites for tridecylphosphite.
triisooctylphosphite
phenyldidodecylphosphite
triamylphosphite
dibutyl phenylphosphite
trioctadecylphosphite

EXAMPLE 6

The procedure of example 3 was repeated combining zinc sulfide as a stabilizer with various prior art stabilizers with results as set forth in the following table:

| Additive (pbw) | Oxygen uptake ccm/gr at 125° C. after | | | |
|---|---|---|---|---|
| | 25 hrs | 50 hrs | 100 hrs | 200 hrs |
| 0.3HPT, 0.3TDP, 0.4TEAB, 0.15ZnS | 0.5 | 1.1 | 2.0 | 4.0 |
| 0.3HPT, 0.3TDP, 0.4TCB | 2.0 | 2.8 | 4.2 | 7.0 |
| 0.3HPT, 0.3TDP, 0.4TCB, 0.15ZnS | 2.0 | 2.5 | 3.4 | 6.3 |
| 0.3APH, 0.3TDP, 0.4TCB | 2.0 | 4.0 | 9.4 | 14.5 |
| 0.3APH, 0.3TDP, 0.4TCB, 0.15ZnS | 0.5 | 1.5 | 3.5 | 10.0 |
| 0.3 Permalux, 0.3HPT, 0.4TDP | 1.8 | 2.8 | 4.2 | 6.8 |
| 0.3 Permalux, 0.3HPT, 0.4TDP 0.15ZnS | 0.8 | 1.2 | 2.3 | 3.2 |

TDP: Tridecylphosphite
HPT: Hexamethylphosphoric triamide
TCB: Tricetylborate
TEAB: Triethanolamineborate
APH: β-acetylphenylhydrazine
Permalux: Di-orthotolylquanidine salt of catechol borate It is known in the art that sulfur containing stabilizers have not met with great success. The reason for this is that in an extrusion or molding operation, at the elevated temperatures encountered, the sulfur containing stabilizer decomposes liberating noxious sulfur containing gases that are harmful to equipment and which create a health hazard. However, it is an unexpected result of the subject invention that the sulfides do not appear to decompose upon molding and no sulfur fumes are detectable. Moreover, no attack on the material of the mold is observed as would be expected if sulfur were liberated.

It has also been observed that polymer formulations in accordance with the invention containing a sulfide, typically an additional stabilizer such as tridecylphosphite and a pigment, especially carbon black, do attack silver or copper metal surfaces to some extent. As a result, some difficulty has been encountered when using these materials in conjunction with electrical contacts. This difficulty is evidenced by discoloration of the silver or copper surface in direct or indirect contact with the polymer formulation.

It is also a discovery of this invention that this attack can be minimized by addition of minor amounts of zinc oxide to the formulation, typically from 0.1 to 1.0 parts by weight per 100 parts of the blend. The effectiveness of this addition is illustrated by the following example.

EXAMPLE 7

A blend was prepared in accordance with the process of Example 1 comprising 45 parts of a poly(2,6-dimethyl-1,4-phenylene)ether, 55 parts of a high impact polystyrene (HT-91-1) and 1.5 parts of polyethylene. To this standard formulation were added 0.25 parts of N,N'-distearoylethylenediamine, 1 part tridecylphosphite 0.5 parts carbon black and 0.15 parts of zinc sulfide.

A second formulation of the same composition was prepared, but with the addition of 0.25 parts of zinc oxide.

Test products were prepared by passing the blends through a vented extruder to form an extruded strand which was chopped into pellets. In order to check the metal attack the following test procedures were used.

Test a:

The pellets were heated in a test tube for 2 hours at 300° C. in air. A piece of silver metal is placed 4 cm over the pellets facilitating direct contact between the metal and the fumes liberating from the heated pellets. Metals parts were inspected for discoloration of the surface.

Test b:

Test specimens were made by injection molding parts from the pellets. Then, 20 test specimens still warm were placed in an Erlenmeyer (2 liters) and a piece of silver metal added. The stoppered Erlenmeyer was kept at ambient temperature for approx. 24 hours. Again the metal piece was inspected for surface appearance e.g. silver attack.

The results obtained indicate that silver and copper is severely attacked if brought in contact with pellets (test a) or test specimens (test b) originating from blends which do not contain zinc oxide. If zinc oxide is incorporated in the formulation, no attack could be observed.

I claim:

1. A stabilized polyphenylene ether composition comprising from 40 to 60 parts by weight of poly-(2,6-dimethyl-1,4-phenylene)ether, from 40 to 60 parts of a high impact strength polystyrene, at least 0.01 percent by weight of an inorganic metal sulfide and also containing zinc oxide in an amount of from 0.1 to 1.0 parts by weight per 100 parts of the composition.

2. A stabilized polymer composition comprising a polyphenylene ether which corresponds to the formula:

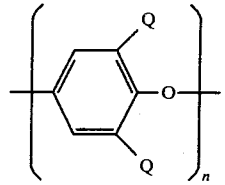

where the oxygen ether atom of one unit is connected to the benzene nucleus of the next adjoining unit, n is a positive integer and is at least 100, and each Q is lower alkyl and a polystyrene, the composition containing a stabilizing quantity of an inorganic metal sulfide in combination with an organic phosphite and zinc oxide.

3. A stabilized polymer composition comprising a polyphenylene ether which corresponds to the formula:

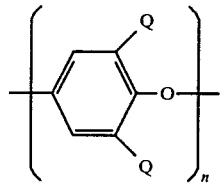

where the oxygen ether atom of one unit is connected to the benzene nucleus of the next adjoining unit, n is a positive integer and is at least 100, and each Q is lower alkyl and a polystyrene, the composition containing a stabilizing quantity of zinc sulfide in combination with an organic phosphite and zinc oxide.

* * * * *